(12) United States Patent
Warnking

(10) Patent No.: US 12,431,940 B2
(45) Date of Patent: Sep. 30, 2025

(54) INTERFACE FOR ENERGY AND DATA TRANSMISSION

(71) Applicant: Endress+Hauser Wetzer GmbH+Co. KG, Nesselwang (DE)

(72) Inventor: Michael Warnking, Wertach (DE)

(73) Assignee: ENDRESS+HAUSER WETZER GMBH+CO. KG, Nesselwang (DE)

( * ) Notice: Subject to any disclaimer, the term of this patent is extended or adjusted under 35 U.S.C. 154(b) by 415 days.

(21) Appl. No.: 17/998,089

(22) PCT Filed: Apr. 19, 2021

(86) PCT No.: PCT/EP2021/060097
§ 371 (c)(1),
(2) Date: Nov. 7, 2022

(87) PCT Pub. No.: WO2021/223995
PCT Pub. Date: Nov. 11, 2021

(65) Prior Publication Data
US 2023/0170937 A1   Jun. 1, 2023

(30) Foreign Application Priority Data

May 8, 2020   (DE) ...................... 10 2020 112 540.2

(51) Int. Cl.
*H04B 5/00*   (2024.01)
*H02J 50/10*   (2016.01)
(Continued)

(52) U.S. Cl.
CPC ................ *H04B 5/79* (2024.01); *H02J 50/10* (2016.02); *H04B 5/24* (2024.01)

(58) Field of Classification Search
CPC .. H02J 50/10; H04B 5/24; H04B 5/79; H04B 5/00; H04B 5/0037; H04B 5/0075
See application file for complete search history.

(56) References Cited

U.S. PATENT DOCUMENTS 5,515,399 A   5/1996   Swart
6,091,779 A   7/2000   Griessbach
(Continued)

FOREIGN PATENT DOCUMENTS

CN   1169783 A   1/1998
DE   19653522 A1   6/1998
(Continued)

*Primary Examiner* — Tuan H Nguyen
(74) *Attorney, Agent, or Firm* — Brannon Sowers & Cracraft PC

(57) ABSTRACT

A galvanically separating interface for transmitting electrical energy and data packets is based upon the clocked polarity reversal of a primary coil such that a corresponding alternating voltage signal is induced in a secondary coil. The primary coil is separated from the supply voltage or ground after each polarity reversal per cycle for a defined dead time. Electrical pulses are generated in the primary coil within dead times and correspond to the data packet to be transmitted. By rectifying the alternating voltage signal induced in the secondary coil, the transmitted energy can be used. Simultaneously, the pulses generated on the primary side can be detected via the secondary coil in accordance with the transmission standard as the data packet to be transmitted. This use of dead times as a "bit" enables a rapid data transmission rate which corresponds to the polarity reversal clock rate.

9 Claims, 3 Drawing Sheets

(51) Int. Cl.
*H04B 5/24* (2024.01)
*H04B 5/79* (2024.01)

(56) References Cited

U.S. PATENT DOCUMENTS

2009/0189459 A1\* 7/2009 Seefried ................. H01F 38/14
307/104
2016/0221451 A1\* 8/2016 Plum ....................... H02J 50/10

FOREIGN PATENT DOCUMENTS

| DE | 102007060555 | A1 | 6/2009 |
|----|--------------|----|--------|
| DE | 102009014452 | A1 | 4/2010 |
| DE | 102014108497 | A1 | 12/2014 |
| DE | 102013113598 | A1 | 6/2015 |
| DE | 102013114377 | A1 | 6/2015 |
| DE | 102014224701 | A1 | 6/2016 |
| EP | 0858172 | A1 | 2/1998 |
| EP | 0858174 | A2 | 8/1998 |
| EP | 2083407 | A1 | 7/2009 |

\* cited by examiner

INTERFACE FOR ENERGY AND DATA TRANSMISSION

CROSS-REFERENCE TO RELATED APPLICATIONS

The present application is related to and claims the priority benefit of DPMA Patent Application No. 10 2020 112 540.2, filed on May 8, 2020, and International Patent Application No. PCT/EP2021/060097, filed Apr. 19, 2021, the entire contents of which are incorporated herein by reference.

TECHNICAL FIELD

The invention relates to an interface for data and energy transmission to field devices.

BACKGROUND

In automation technology, especially in process automation technology, field devices serving to detect and/or influence various measured variables are frequently used. The measured variable to be determined can, for example, be a temperature, a fill-level, a flow, a pressure, the pH value, the redox potential, a conductivity, or the dielectric value of a medium. To detect the corresponding measured values, the field devices each comprise suitable sensors or are based upon suitable measuring principles. A variety of such field devices is manufactured and marketed by the Endress+Hauser group.

The communication with the field device, e.g., starting from a superordinate unit such as a process control center, takes place via an interface suitable in process automation. On the software side, the interface is aligned with the corresponding requirements. For example, 4-20 mA has become established as a robust analog standard in accordance with the DIN IEC 60381-1 standard. In this case, the direct current flowing through the forward and return lines to or from the field device is set such that it represents the current value of the process variable. If it is a two-wire field device, the energy supply of the field device and the transmission of the unit signal take place via the same two-wire line. In the case of a four-wire interface, the energy supply takes place separately via the two additional lines. A field device with a 4-20 mA interface is shown, for example, in the publication document DE 10 2013 114 377 A1.

In modern processing plants, the transmission of measured values or the communication with field devices increasingly takes place by means of digital protocols such as, for example, "IO-Link" according to IEC standard 61131-9, "PROFIBUS," "HART," "Wireless HART," "Modbus," or also "Ethernet." The advantage of this is the lower power consumption compared to current-based transmission protocols. This simplifies the use in explosion-prone areas, since the energy consumption at the field device can be reduced.

In order to comply with corresponding explosion protection requirements in explosion-prone areas, the interface must also be designed such that the field device is galvanically separated from the superordinate unit. In addition, the power transmitted to the field device must not exceed a critical maximum value. It is prevented, especially by the galvanic separation, that compensation currents occur between the plant parts, or that stresses be carried over into the respective other area, thereby risking ignition in the explosion-prone area.

The galvanic separation within the interface relates, with respect to explosion protection, to both the energy supply of the circuit parts and to the data exchange between the superordinate unit and the field device. In this context, the energy and the corresponding data packets are transmitted, for example, via independent channels. Thus, the energy supply can take place via a transformer, wherein the data exchange of the data packets takes place via an optocoupler. However, this is associated especially in the explosion-prone area with a higher space requirement, costs, testing effort, and additional effort for approval. In addition, it is often necessary to operate several field devices via a common superordinate unit, whereby the space requirement is further increased.

Therefore, it is known from the prior art to transmit both data packets and energy for operating the field device via a common transformer, consisting of a primary coil and an inductively-coupled secondary coil. In this regard, modulation methods of the switching frequency and pulse transmission of the signals, which, in accordance with the implemented transmission standard, correspond to the data packet, are known. This is described, for example, in the publication document DE 10 2007 060 555 A1. However, the solution described therein has the disadvantage that the data transmission rate must be significantly smaller than the switching frequency, since the switching frequency is used as a carrier frequency for the modulation. This restricts the data transmission rate.

SUMMARY

Accordingly, the object of the invention is to provide a galvanically separating interface which enables a high data transmission rate to field devices in the explosion-protected area.

The invention achieves this object with a galvanically separating interface for transmitting electrical energy and data packets, which comprises the following components:

a coil arrangement with a primary coil and at least one secondary coil, wherein the coil arrangement is designed such that the primary coil and the at least first secondary coil are inductively coupled to one another, e.g., by means of a corresponding ferromagnetic coil core, but are also galvanically decoupled from one another, a switching unit which is designed in accordance with the push-pull converter principle such that
the primary coil can be connected to a supply voltage and can be separated therefrom (this also comprises that the primary coil can be separated at the ground side so that an electrical connection no longer exists between the supply voltage and ground via the primary coil), and
the polarity of the primary coil can be reversed with regard to the supply voltage, a control unit which is designed to control the switching unit such that
the polarity of the primary coil is reversed at a defined clock rate so that a corresponding alternating voltage signal is induced in the secondary coil,
the primary coil is separated from the supply voltage before or after each polarity reversal per cycle for a defined dead time in each case, and
electrical pulses are generated in the coil arrangement on the primary side in dead times of defined cycles which, in accordance with a defined, serial transmission standard, correspond to the data packet, a rectifier which is designed to rectify the alternating voltage signal induced in the first secondary coil so that the correspondingly-induced energy is available to the field device, and an evaluation unit which is designed to detect the pulses generated on the primary side in accordance with the transmission standard via the first secondary coil as the data packet to be transmitted.

In addition to the energy supply of the field device, the control according to the invention of the switching unit allows, due to the use of the dead times for bit transmission, a high bit transmission rate, which corresponds at least to the clock rate. The electrical pulse, which may possibly correspond to each bit (the pulse corresponds, for example, in the context of the invention to a logical="1," while a pulse not generated during the dead time can be interpreted as a logical "0," or vice versa), can be generated in the primary coil, for example, by the respective switch being closed again briefly. In principle, however, any other form of pulse generation is also conceivable. For example, a second primary coil can alternatively also be used for this purpose, or the pulse can be capacitively coupled into the first primary coil.

In the context of the invention, the term, "unit," is understood in principle to mean any electronic circuit which is designed to be suitable for the intended purpose of use. Depending upon the requirement, it can therefore be an USUS analog circuit for generating or processing corresponding analog signals. However, it can also be a digital circuit such as an FPGA or a storage medium interacting with a program. In this case, the program is designed to perform the corresponding method steps or to apply the necessary computing operations of the respective unit. In this context, different electronic units of the interface or of the measuring system can potentially also, in the sense of the invention, access a common physical storage device or be operated by means of the same physical digital circuit.

In the context of the invention, the polarity reversal of the primary coil can be realized in various ways. In a first variant, this can take place by inversely clocked polarity reversal of the two coil end taps from the supply voltage to ground, and, subsequently, vice versa. In this case, for the polarity reversal or for separation, the switching unit can comprise, for example, two correspondingly arranged switches which can each be switched by the control unit either to the supply voltage, to ground, or open. In this case, the control unit controls the two switches inversely in such a way that the primary coil, between the inverse polarity reversal of the two end taps from ground to supply voltage or vice versa, is separated for the defined dead time in each case at least from the supply voltage or from ground.

Alternatively, the primary coil can comprise a center tap for this purpose. In this case, a variant, which is simple in terms of circuitry, for implementing the push-pull converter principle in turn consists in the center tap being fixedly connected to the supply voltage. The control unit controls the switch in this alternative such that the first switch, corresponding to the clock rate, switches the first end tap to ground and separates it therefrom, and the second switch, corresponding to the clock rate, switches the second end tap to ground and separates it therefrom, i.e., opens it, inversely to the first switch.

In this alternative too, the control unit controls the two switches inversely in such a way that the primary coil, between the opening of the respective switch and the closing of the respective other switch, is separated from ground for the defined dead time.

To enable not only monodirectional communication from the superordinate unit to the field device via the interface, but also vice versa, the interface can be expanded to include the following component:

an energy storage device that can be connected to the secondary coil via a third switch, such as a capacitor or a rechargeable battery, which, for example, can in turn be fed by the rectifier.

In addition, the evaluation unit is to be designed, in this expansion, to control the third switch in such a way that, depending upon a data packet to be transmitted to the superordinate unit, electrical pulses are generated in the secondary coil in dead times of defined cycles (in relation to the primary-side clocking) which, in accordance with the transmission standard, correspond to this data packet. For the primary-side reception of the data packet originating from the field device, the control unit is to be designed in this bidirectional expansion such that it can detect the pulses, generated in the secondary coil, at the primary coil in accordance with the transmission standard as the data packet to be transmitted.

The transmission standard, by means of which the data packets are transmitted to the field device or to the superordinate unit, is not fixedly predefined within the scope of the invention. However, it is especially expedient when, for this purpose, "UART" or "USART" is implemented in the control unit and/or in the evaluation unit as the transmission standard for transmitting the respective data packet. In this context, it should be mentioned that, in the case of bidirectional communication, the transmission standard to the field device does not necessarily have to correspond to the transmission standard in the direction of the superordinate unit.

In order to further increase the data transmission rate, the control unit and/or the evaluation unit can be designed such that the pulses are generated or transmitted with variable energy, such as a variable amplitude or a variable pulse duration. In this case, for example, two different energy states of the pulse can represent a further bit.

By means of the interface according to the invention, it is not only possible to control a single field device or to supply it with energy. In the case of two or more field devices, the coil arrangement can comprise, for example, a second or further secondary coils. In this case, the further secondary coils, corresponding to the first secondary coil, are in turn to be galvanically decoupled from the primary coil. In this case, the data packets to be sent to the field devices—or the data packets received by the respective field device—are to be provided with a corresponding address, thereby enabling an unambiguous assignment. In addition, the further secondary coils, corresponding to the first secondary coil, are each to be equipped with a corresponding rectifier and a corresponding evaluation unit.

Corresponding to the interface according to the invention, according to one of the previously described embodiments, the object of the invention is additionally achieved by a corresponding method for the operation thereof. The method thereby comprises the following steps:

polarity reversal of the primary coil at a defined clock rate so that a corresponding alternating voltage signal is induced in the secondary coil. In this case, the primary coil is separated from the supply voltage or ground before or after each polarity reversal per cycle for a defined dead time in each case, generating electrical pulses in the primary coil within dead times of defined cycles that, in accordance with a defined, serial transmission standard, correspond to the data packet, rectifying the alternating voltage signal induced in the secondary coil in order to thereby be able to use the transmitted energy on the secondary side, and detecting the pulses generated in the primary coil via the secondary coil in accordance with the transmission standard as the data packet to be transmitted.

On the basis of the interface according to the invention, a corresponding measuring system can be realized, e.g., for use in an explosion-prone processing plant. In order to realize such a measuring system, in addition to the interface according to one of the preceding embodiments, it also requires at least:

one superordinate unit,
which is designed to generate a data packet, and
which is connected to the interface on the primary side, and one field device, such as a temperature sensor or a fill-level measuring device, which is connected to the interface on the secondary side.

As a result, the data packet, in accordance with the transmission standard, can be transmitted from the superordinate unit via the interface to the field device. At the same time, the interface separates the field device galvanically from the superordinate unit, wherein the superordinate unit can supply the field device with energy via the interface despite the galvanic separation.

BRIEF DESCRIPTION OF THE DRAWINGS

The invention is explained in more detail with reference to the following figures. The following are shown.

DETAILED DESCRIPTION

Figure 1:
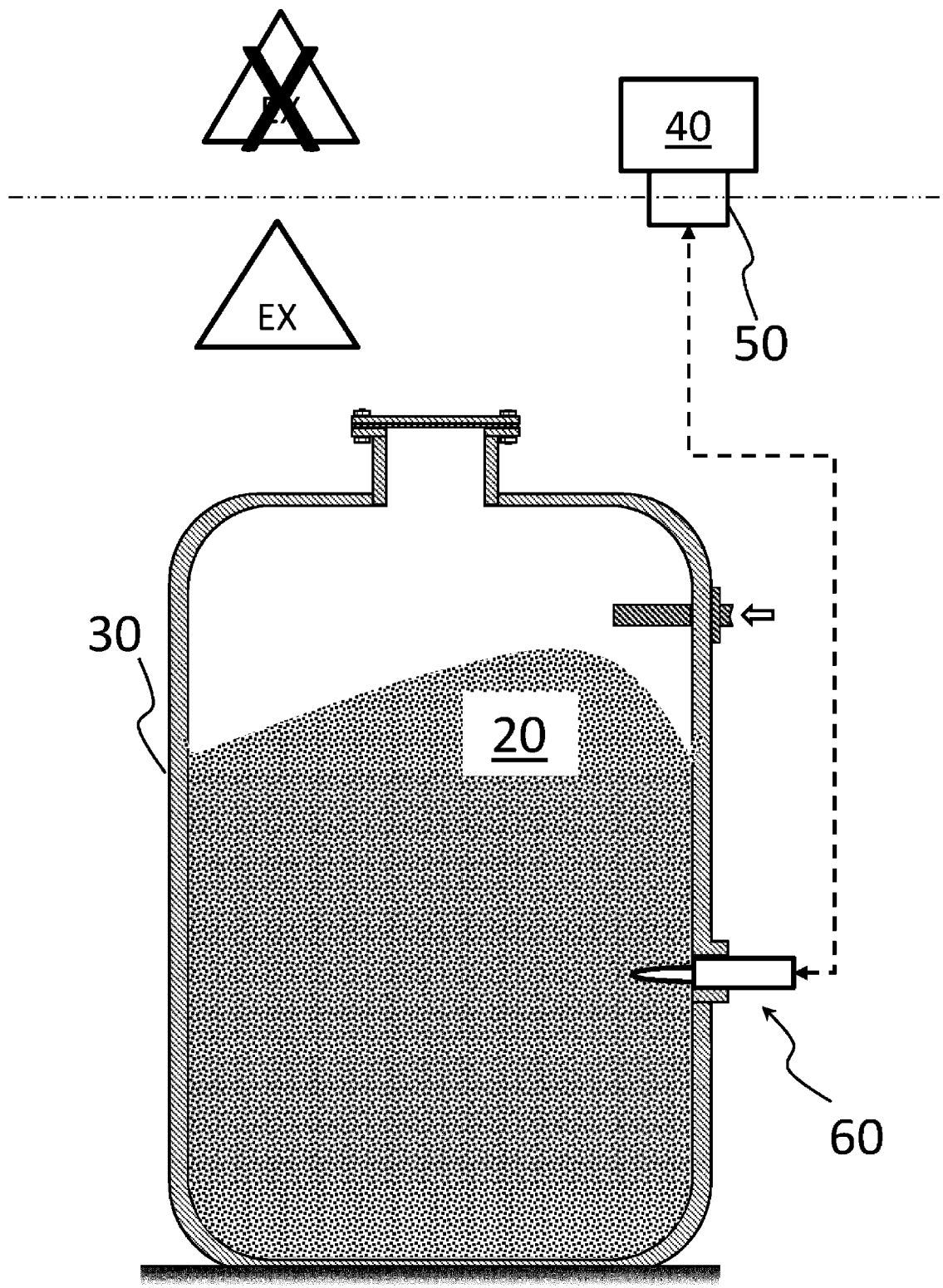
FIG. 1 shows a schematic arrangement of the interface according to the present disclosure within a processing plant.

For general understanding of the invention, a processing plant with a measuring system according to the invention is shown in FIG. 1. The measuring system is based upon a field device 60 which serves to determine a process variable, such as a temperature or a fill-level of a filling material 20 in a container 30 of the processing plant. For this purpose, the field device 60 is attached to a lateral connection of the container 30, such as a flange connection, so that the field device 60 is in corresponding contact with the filling material 20. To supply energy to the field device 60 and to transmit data packets, such as, for example, control inputs or measured values, the field device 60 is connected via an interface 50 according to the invention to a superordinate unit 40 such as a process control center. For this purpose, "4-20 mA," "10 Link," "PROFIBUS," "HART," "Modbus," or also "Ethernet" can be implemented as the software-side interface. On the basis of the measured values obtained, the superordinate unit 40 can also regulate, for example, corresponding pumps or valves on the container 30, in addition to the field device 60. It becomes clear from this that a high data transmission rate between the superordinate unit 40 and the field device 60 is essential for a low-delay and thus safe regulation within the processing plant or within the measuring system.

The container 30 can, for example, be a storage tank for liquids such as paints, cement, or fuels, such as liquid gases or mineral oils. It can also, for example, be a reactor in which the corresponding reactants are processed. Due to the associated risk of explosion, the area within the processing plant in which the container 30 is located is defined as an explosion-prone area. On the basis of this, the field device 60 must be designed to comply with explosion protection, e.g., in Europe, according to the EN 60079 series of standards. Therefore, the field device 60 may be supplied, on the one hand, only with limited power. On the other hand, the field device 60 must be galvanically separated from the superordinate unit 40, which is located outside the explosion-prone area.

Figure 2:
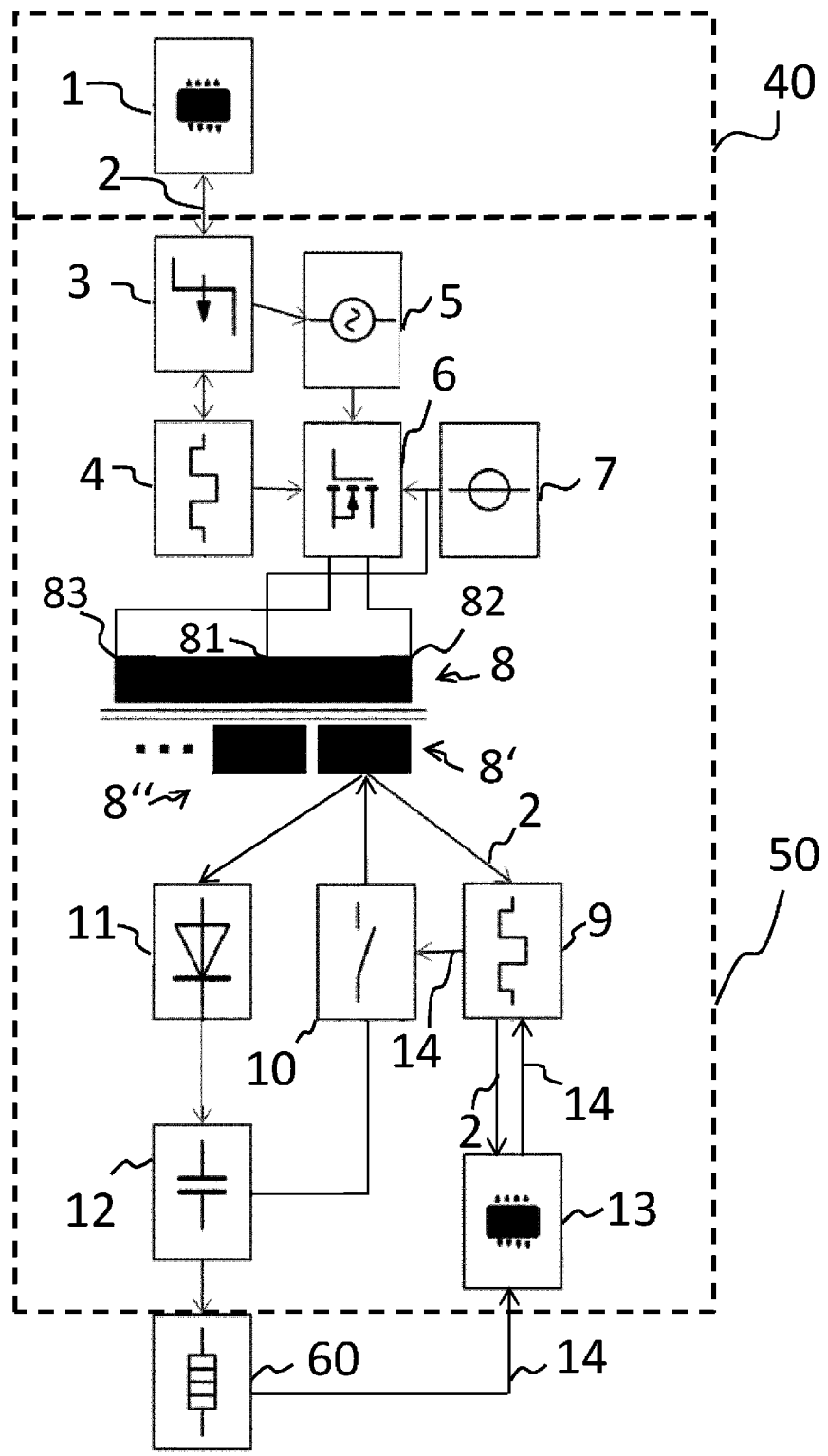
FIG. 2 shows a block diagram of an exemplary embodiment of the interface.

The design according to the invention of the interface 50, by means of which the field device 60 is galvanically separated from the superordinate unit 40, is explained in more detail as a block diagram in FIG. 2: The energy supply of the field device 60 here starts from a direct voltage supply 7 on the primary side of the interface 50, wherein the interface 50 is connected on the primary side to the superordinate unit 40. For the inductive transmission of the electrical energy to the secondary side of the interface 50, to which the field device 60 is connected, the supply voltage 7 is connected on the primary side to a center tap 81 of a primary coil 8 of a transformer. In this case, the transformer is designed such that the primary coil 8 and the first secondary coil 8' are inductively coupled to one another—for example, via a corresponding coil core. Nevertheless, both coils 8, 8', as is generally required in transformers, are galvanically decoupled from one another, so that the field device 60 is also galvanically decoupled from the superordinate unit 40 as a result.

In the embodiment of the interface 50 according to the invention shown in FIG. 2, the primary coil 8 has a symmetrical center tap 81, which is connected to the supply voltage 7. The two end taps 82, 83 of the primary coil 8 can each be connected at least indirectly to ground via a first switch of a primary-side switching unit 6. In this case, the switching unit 6 is in turn controlled by a primary-side control unit 3, 4, 5. The control unit 3, 4, 5 controls the first switch on the first end tap 82 such that it is switched to ground, corresponding to a defined clock rate, and is again separated therefrom. The clock rate is in turn specified for the switching unit 6 by an oscillator 5 of the control unit 3, 4, 5 or its oscillation frequency.

Figure 3:
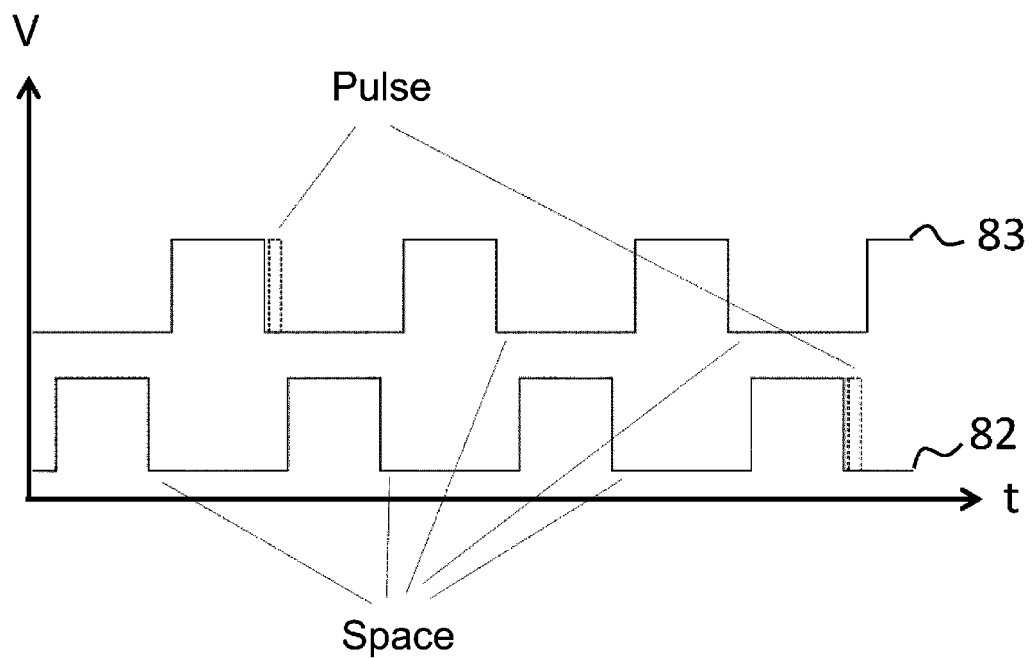
FIG. 3 shows a clocked data transmission according to the present disclosure within the interface.

The second switch of the switching unit 6 at the second end tap 83 of the primary coil 8 is also controlled by the control unit 3, 4, 5 in such a way that the second end tap 83 is switched to ground, corresponding to the clock rate, and is separated therefrom, but, in terms of time, is exactly inverse to the first switch on the first end tap 82. The corresponding inversely-clocked control of the two switches is shown schematically in FIG. 3. The graph there represents the temporally-inverse switching voltage characteristic at the inputs of the two switches for the end taps 82, 83 of the primary coil 8. In this regard, the switches of the switching unit 6 can accordingly be designed, for example, as transistors. As can also be seen from FIG. 3, the two switches are controlled in a temporally-inverse manner by the control unit 3, 4, 5 in such a way that the one switch is not closed at the same time as the respective other switch is opened. Rather, the closing of the respective switch in relation to the opening of the respective other switch takes place with such a delay that the primary coil 8 is separated from ground between the opening of the one switch and the closing of the respective other switch for the defined dead time ("space") in each case.

The clocked polarity reversal of the primary coil 8 by mutual grounding of the end taps 82, 83 induces a corresponding alternating voltage signal in the secondary coil 8'. By means of a secondary-side rectifier 11, this alternating voltage signal is rectified and provided to the field device 60 as energy or supplied to an energy storage device 12 such as a buffer capacitor for interim storage. As indicated in FIG. 2, the supply voltage 7 also serves, in addition to transmitting energy to the field device 60, to supply voltage to the further electronic components 3, 4, 5, 6 on the primary side of the interface 50.

The transmission of data packets 2 from the primary to the secondary side, i.e., from the superordinate unit 40 to the field device 60, is initiated by a main processor 1 of the superordinate unit 40, which processor generates the data packet 2 on the basis of a defined, serial transmission standard and provides it to the interface 50. In this case, the embodiment of the interface 50 shown in FIG. 2 is realized on the basis of "UART": In order to avoid bit errors due to deviations between the phase or clock rate of the UART and the frequency/phase of the oscillator 5, the oscillator 5 is synchronized with each falling edge (i.e., with at least the start bit) of the UART via an edge detector 3. In the case of a clock-controlled interface, such as, for example, based upon "USART" or "SPI," the cycle is generated from the oscillator 5 so that the cycle runs synchronously with the oscillator 5 without additional synchronization. Since the frequency of the oscillator 5 specifies the transmission clock rate, the oscillator or its frequency is to be implemented as a function of the selected transmission standard. In the case of "UART," n*1,200 Hz or bit/s, for example, can therefore be selected as the oscillator frequency or as the clock rate. The advantage of the interface 40 according to the invention again becomes apparent from this, viz., that the data packet 2 can be transmitted with a high bit transmission rate which corresponds to the clock rate.

On the primary side, the data packet 2 arriving from the main processor 1 is processed with a signal processor 4, consisting of logic gates and/or analog circuits suitable for this purpose, in such a way that, in the corresponding dead time, an, in particular, pulse-shaped signal is generated at a respective input of the switching unit 6, but only if, in accordance with the transmission standard, a pulse, i.e., a logical "1," is to be sent to the first secondary coil 8'. This is in turn illustrated in the graph from FIG. 3: There, the switching voltage characteristic at the respective input of the two switches of the switching unit 6 for the end taps 82, 83 has a corresponding pulse, i.e., logical "1," in the corresponding dead times. If no pulse is generated or detected in a corresponding dead time (symbolized in FIG. 3 as "space"), this is detected by the microcontroller as a logical "0."

The possible pulse is detected within a secondary-side evaluation unit by a second signal processing unit 9 and transferred to a secondary-side microcontroller 13, which detects the pulse sequence in accordance with the selected transmission standard as the data packet 2 to be transmitted. The secondary side is synchronized via the secondary-side second signal processing unit 9, which runs through the clocking of the alternating voltage signal synchronously with the primary-side oscillator 5. Thus, the interface between the signal processing unit 9 and the microcontroller 13 corresponds in the exemplary embodiment shown in FIG. 2 to a USART.

For data transmission from the secondary to the primary side, i.e., for example, for transmitting HART signals or measured values of the field device 60 to the superordinate unit 40, the interface 50 comprises a third switch 10 on the secondary side. This can connect the energy storage device 12 to the first secondary coil 8' or separate it therefrom. By briefly closing and opening the third switch 10, corresponding pulses can thus in turn be generated in the first secondary coil 8'. The third switch 10 is controlled by the second signal processing unit 9 of the secondary-side evaluation unit.

In order to transmit a possible data packet 14 from the microcontroller 13 to the primary side, the third switch 10 can be closed and opened analogously to the primary-side switching unit 6 by the signal processing unit 9 in such a way that corresponding pulses are generated in the first secondary coil 8' within defined dead times of the cycles which are defined by the primary side. The respective dead times in turn, in accordance with the transmission standard, correspond to the data packet 14. The clocking of the third switch 10 synchronously to the primary side is ensured in this case, since the second signal processing unit 9 is clocked synchronously to the primary side via the incoming alternating voltage signal. In a corresponding design, the control unit 3, 4, 5 on the primary side can thus detect the pulses, generated in the secondary coil 8', at the primary coil 8 in accordance with the transmission standard in turn as the data packet 14 to be transmitted and, if necessary, transfer them further to the superordinate unit 40.

In the embodiment of the galvanically separating interface 50 according to the invention shown in FIG. 2, rapid bidirectional communication between the superordinate unit 40 and the field device 60 is thus possible, the bit rate of which corresponds to a maximum of twice the clock frequency.

On the basis of the interface 50 according to the invention, it is in principle also possible to control several field devices. As indicated in FIG. 2, the transformer can for this purpose comprise further secondary coils 8", to which further field devices can be connected, analogously to the first field device 60. In this case, the data packets to be sent to the field devices 60—or the data packets received by the respective field device 60—are provided by the superordinate unit 40 or the respective field device with an address which allows an assignment of the data packet 2, 14 to the respective field device 60.

The invention claimed is:

1. A galvanically separating interface for transmitting electrical energy and data packets, the galvanically separating interface comprising:
   a coil arrangement including a primary coil and a first secondary coil, wherein the coil arrangement is designed such that the primary coil and the first secondary coil are inductively coupled to one another and are galvanically decoupled from one another;
   a switching unit which is designed such that the primary coil can be connected to a supply voltage and can be separated therefrom, and a polarity of the supply voltage on the primary coil can be reversed;
   a control unit which is designed to control the switching unit such that: the primary coil is reversed in polarity at a defined clock rate so that a corresponding alternating voltage signal is induced in the first secondary coil; the primary coil is separated from the supply voltage before or after each polarity reversal per cycle for a defined dead time in each case; and electrical pulses are generated in the coil arrangement on a primary side in dead times of defined cycles which, in accordance with a defined, serial transmission standard, correspond to the data packet;
a rectifier which is designed to rectify the corresponding alternating voltage signal induced in the first secondary coil; and
an evaluation unit which is designed to detect the electrical pulses generated on the primary side in the coil arrangement in accordance with the transmission standard via the first secondary coil as the data packet to be transmitted.

2. The galvanically separating interface according to claim 1, wherein the primary coil includes a first end tap, a center tap, and a second end tap, and wherein the switching unit for separating the primary coil from the supply voltage and for the defined polarity reversal thereof comprises two switches switched by the control unit.

3. The galvanically separating interface according to claim 2, wherein the center tap is connected to the supply voltage, and wherein the control unit switches the switches such that a first switch of the two switches, corresponding to the clock rate, switches the first end tap to ground and separates it therefrom, and the second switch of the two switches, corresponding to the clock rate, switches the second end tap to ground and separates it therefrom inversely to the first switch, and
wherein the control unit controls the two switches inversely such that the primary coil is separated from ground between the opening of the respective switch and the closing of the respective other switch for the defined dead time in each case.

4. The galvanically separating interface according to claim 3, further comprising:
an energy storage device which can be connected to the first secondary coil via a third switch, wherein the energy storage device is fed by the rectifier,
wherein the evaluation unit is designed to control the third switch in such a way that, depending upon a data packet to be transmitted, electrical pulses are generated in the first secondary coil in dead times of defined cycles, which, in accordance with the transmission standard, correspond to the data packet, and
wherein the control unit is designed to detect the pulses, generated in the first secondary coil, at the primary coil in accordance with the transmission standard as the data packet to be transmitted.

5. The galvanically separating interface according to claim 1, wherein, in the control unit and/or in the evaluation unit, UART or USART is implemented as the transmission standard for transmitting the data packet.

6. The galvanically separating interface according claim 1, wherein the control unit and/or the evaluation unit are/is designed to transmit the pulses with a variable energy.

7. The galvanically separating interface according to claim 1, wherein the coil arrangement further includes a second secondary coil.

8. A measuring system, comprising:
a superordinate unit, which is designed to generate a data packet;
a field device; and
a galvanically separating interface, including,
a coil arrangement including a primary coil and a first secondary coil, wherein the coil arrangement is designed such that the primary coil and the first secondary coil are inductively coupled to one another and are galvanically decoupled from one another;
a switching unit which is designed such that the primary coil can be connected to a supply voltage and can be separated therefrom, and a polarity of the supply voltage on the primary coil can be reversed;
a control unit which is designed to control the switching unit such that the primary coil is reversed in polarity at a defined clock rate so that a corresponding alternating voltage signal is induced in the first secondary coil, the primary coil is separated from the supply voltage before or after each polarity reversal per cycle for a defined dead time in each case, and electrical pulses are generated in the coil arrangement on a primary side in dead times of defined cycles which, in accordance with a defined, serial transmission standard, correspond to the data packet;
a rectifier which is designed to rectify the corresponding alternating voltage signal induced in the first secondary coil; and
an evaluation unit which is designed to detect the electrical pulses generated on the primary side in the coil arrangement in accordance with the transmission standard via the first secondary coil as the data packet to be transmitted,
wherein the galvanically separating interface is connected on the primary side to the superordinate unit and on a secondary side to the field device such that the data packet, in accordance with the transmission standard, can be transmitted to the field device, the superordinate unit supplies the field device with energy via the galvanically separating interface, and the field device is galvanically separated from the superordinate unit.

9. A method for transmitting energy and data packets via a galvanically separating interface, comprising:
providing a galvanically separating interface, including:
a coil arrangement including a primary coil and a first secondary coil, wherein the coil arrangement is designed such that the primary coil and the first secondary coil are inductively coupled to one another and are galvanically decoupled from one another;
a switching unit which is designed such that the primary coil can be connected to a supply voltage and can be separated therefrom, and a polarity of the supply voltage on the primary coil can be reversed;
a control unit which is designed to control the switching unit such that the primary coil is reversed in polarity at a defined clock rate so that a corresponding alternating voltage signal is induced in the first secondary coil, the primary coil is separated from the supply voltage before or after each polarity reversal per cycle for a defined dead time in each case, and electrical pulses are generated in the coil arrangement on a primary side in dead times of defined cycles which, in accordance with a defined, serial transmission standard, correspond to the data packet;
a rectifier which is designed to rectify the corresponding alternating voltage signal induced in the first secondary coil; and
an evaluation unit which is designed to detect the electrical pulses generated on the primary side in the coil arrangement in accordance with the transmission standard via the first secondary coil as the data packet to be transmitted;

reversing a polarity of the primary coil at a defined clock rate so that the corresponding alternating voltage signal is induced in the first secondary coil, wherein the primary coil is separated from the supply voltage or ground before or after each polarity reversal per cycle for the defined dead time in each case;

generating electrical pulses in the primary coil within dead times of defined cycles which, in accordance with a defined, serial transmission standard, correspond to the data packet;

rectifying the corresponding alternating voltage signal induced in the first secondary coil, and detecting the electrical pulses generated in the primary coil via the secondary coil in accordance with the transmission standard as the data packet to be transmitted.

\* \* \* \* \*